United States Patent Office.

OSKAR LIEBREICH, OF BERLIN, GERMANY.

PROCESS OF MANUFACTURING SOAP.

SPECIFICATION forming part of Letters Patent No. 265,520, dated October 3, 1882.

Application filed April 5, 1882. (No specimens.)

*To all whom it may concern:*

Be it known that I, OSKAR LIEBREICH, a subject of the Emperor of Germany, and a resident of Berlin, Kingdom of Prussia, German Empire, have invented certain new and useful Improvements in Process of Manufacturing Soap, of which the following is a specification.

In the manufacture of soap the process commonly practiced consists in producing the oil required for the manufacture of soap from the oleiferous fruits or seeds by subjecting them to pressure, or sometimes by chemical treatment, and then subjecting this oil by well-known means to saponification.

The object of my invention is to effect the direct saponification of oleiferous fruits or seeds, thereby avoiding the prior production of the oil, and producing saponification directly in the fruit, so that in my process no separation of oil and residuum takes place prior to the saponification, as heretofore practiced, but a separation of ready-formed soap from the residuum is required.

In carrying out my invention I proceed as follows: Oleiferous fruits or seeds, or parts of the same, are either in whole or in a reduced state exposed to a temperature of from 100° to 180° centigrade. As the temperature rises, particularly above 130° centigrade, many organic substances are destroyed, while the fat remains substantially unchanged. The height of the temperature and the duration of the same depends upon the nature and the quantity of the material. It is desirable to expose the same to the increased temperature, until it becomes brittle when rubbed. A substantial decomposition of the oil must not take place. The material obtained by this roasting process is further treated, as hereinafter described; but in some cases the roasting process may be dispensed with and the oleiferous fruit subjected directly to the subsequent treatment. The roasted or unroasted material is comminuted so that it forms a pasty powder, or a heap of very small pieces, which, when the mass has been roasted, consists essentially of cellulose, and which are treated with soda or potash lye, or with another alkali in concentrated form and employed in excess, so as to effect saponification directly in the mass. The quantity of the alkaline lye depends upon the percentage of fat contained in the mass to be saponified, and the proportion of fat and lye is the same as usually employed in the manufacture of soap; but, as already remarked, an excess of lye is desirable. The product obtained by this treatment is subjected to the action of water by colation of the parts which are not saponified, which, as already stated, consists chiefly of cellulose. If desired, the lye and water can be added simultaneously, and then the parts not saponified are separated by colation. The liquid obtained by the colation is finally evaporated, and the product obtained by this operation is the so-called "black raw soap," or, if common salt is added, a grain soap, either in lumps or in powder form, can be obtained as a raw product. The final product of the entire operation of manufacturing soap is obtained by treating the grain soap with diluted alkaline solutions in the well-known manner.

In order to cause the formation of fatty acids from oleiferous fruits or seeds, such fruits or seeds, either in their natural state or after having been roasted, are treated with superheated steam. The fatty acids thus formed can be separated by mechanical or chemical means, and used in the manufacture of soaps or of candles.

I am aware that it is not broadly new to extract oil from seed, and then subject such seed to the action of an alkali for manufacturing soap. I am also aware that seeds have been subjected to a crushing process, the oil being extracted therefrom and the refuse seed pressed into cakes, which are saponified when the cakes are boiled with caustic soda and water. Such therefore I do not claim; but

What I claim as new, and desire to secure by Letters Patent, is—

The within-described process for producing soap from oleiferous fruits or seeds, by first subjecting such fruits or seeds to a roasting operation, then treating the product thus obtained with alkaline lyes, and finally separating the parts which have saponified from those not saponified, substantially as set forth.

In testimony whereof I have signed my name to this specification.

OSKAR LIEBREICH.

Witnesses:
MARKUS M. RATTEN,
GEORG SLADCRYK.